United States Patent Office 3,485,774
Patented Dec. 23, 1969

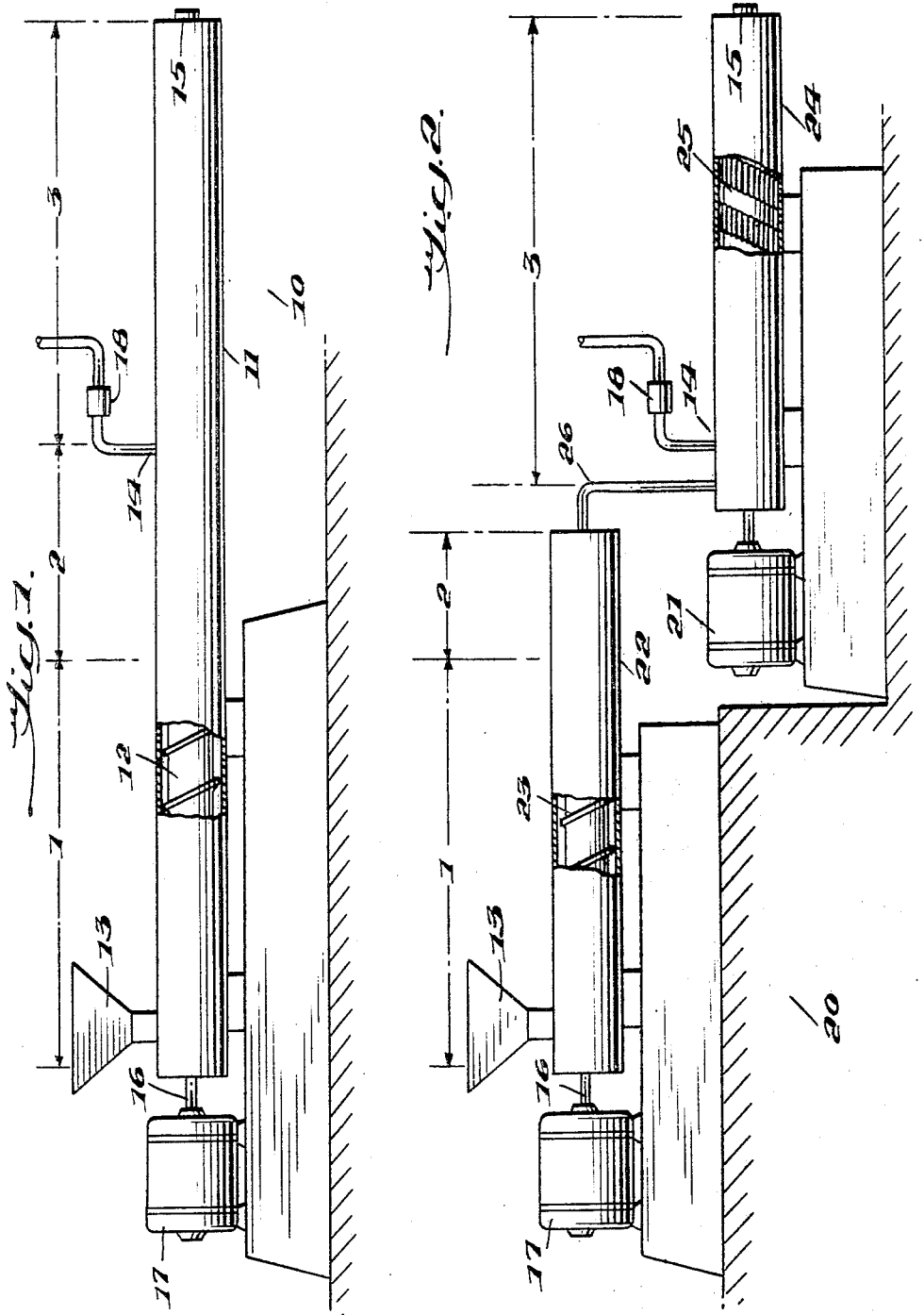

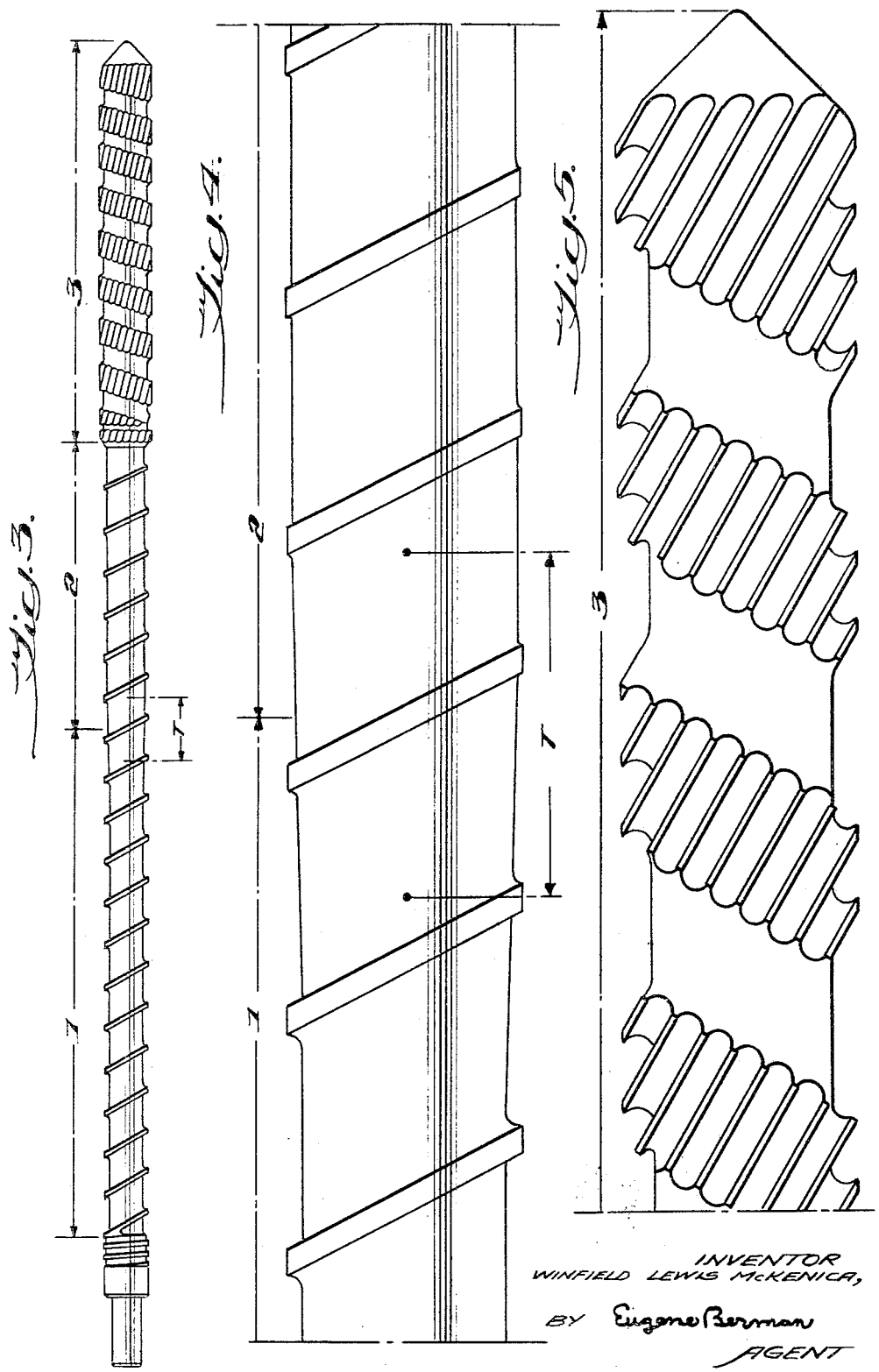

3,485,774
PROCESS FOR THE FORMATION OF FOAMABLE COMPOSITIONS
Winfield Lewis McKenica, Wilmington, Del., assignor to E. I. du Pont de Nemours and Company, Wilmington, Del., a corporation of Delaware
Filed Apr. 21, 1966, Ser. No. 544,161
Int. Cl. C08f 47/10
U.S. Cl. 260—2.5      10 Claims

ABSTRACT OF THE DISCLOSURE

An improved process for forming foamable compositions comprising polymer, liquid foaming agent and solid nucleation agent is provided. The improvement comprises melting the polymer, metering the molten polymer into a mixing zone characterized by relatively low shear gradients, forming a dilute suspension of the solid nucleation agent in the liquid foaming agent (preferably stabilized with e.g., n-butanol) and introducing the suspension into the mixing zone where it is mixed with the molten polymer. When the composition is thereafter extruded into a region of substantially reduced pressure, useful foamed objects are formed which have a desired decrease in cell-size of improved cell-size uniformity, at reduced bubble-nucleation agent concentration.

---

This invention relates to the preparation of polymeric foams with uniform small cells. More particularly it relates to an improved method for incorporating finely divided, solid, bubble-nucleation agents into foamable compositions comprising thermoplastic polymers.

Shaped, foamed objects comprised of thermoplastic polymers are commonly produced by direct extrusion in which a foamable composition at elevated temperature and pressure is forced through a suitable orifice into a region of substantially reduced pressure. A low-boiling, volatile, liquid or liquefied foaming agent within the foamable composition vaporizes as a result of the rapidly decreased pressure to expand the composition and to produce either an open or a closed-cell foam. Such compositions may contain, in addition to the thermoplastic polymer and the liquid foaming agent, various additives such as stabilizers, anti-oxidants, flame retardants, dyes, surfactants, thermally decomposable gas-forming solids, and the like.

For a given liquid foaming agent there is a temperature or a narrow temperature range above which it self-nucleates, that is, forms about $10^{10}$ or more bubbles per gram of foamable composition in the absence of solid bubble-nucleation agents. Below this self-nucleation temperature and in the absence of solid-nucleation agents, the number of cells formed per gram of foamable composition is usually about $10^2$ to $10^4$, depending on how many adventitious dust particles are present, and the cell-sizes are normally widely different within a given product. Frequently a given foamable composition must be or preferably is extruded at temperatures below the self-nucleation temperatures, and the incorporation of inert, finely divided, solid, bubble-nucleation agents is known to provide the desired reduction in size of cells and to improve cell-size uniformity. This is generally true when the thermoplastic polymer is polyethylene or polypropylene.

Foams with very small cells, particularly when of the closed-cell variety, are frequently more suitable for uses requiring, for example, good thermal-insulation properties, low gas permeation rates, uniform dielectric properties, and high levels of pneumaticity of the foam. While providing improvements in these properties through cell-size control, solid bubble-nucleation particles are necessarily retained in the foamed products and simultaneously tend to diminish by their presence the improvement in properties of the foam. Also, it is known that finely-divided bubble-nucleation agents, when subjected to the high temperatures and shear stresses employed to melt polymers in customary screw-extruders, tend to form large agglomerates. When thin films or narrow filaments are prepared by extrusion, the orifices employed necessarily have very narrow dimensions which are readily plugged or partially obstructed by these agglomerates. Or, if filters are employed to obviate plugging of orifices, the filters are quickly filled with agglomerates. Obviously, solid bubble-nucleation agents are preferably employed in the smallest quantites consistent with the desired decrease in cell-size and improvement in cell-size uniformity.

A wide variety of volatile liquid or liquefied foaming agents can be employed. Ordinarily it is preferred that the foaming agent have an atmospheric boiling point at least 25° C., and more preferably at least 60° C., below the melting temperature of the polymer. Choice of foaming agent depends on the polymer to be foamed. Specific non-limiting examples include: lower alkanes such as propane, butane, pentane and hexane, lower haloalkanes such as methylene chloride, methyl chloride, ethylene chloride, chloroform, trichlorofluoromethane, dichlorodifluoromethane and 1,2-dichloro-1,1,2,2-tetrafluoroethane; alcohols such as methanol and ethanol; and even water. Mixtures of two or more foaming agents are frequently employed.

Many variations in processes for the extrusion of foamed objects are in use. In some, all components of the foamable composition are blended in a hopper before proceeding to a screw extruder for melting the polymer and for intimately mixing the components. Polystyrene foams are frequently produced this way. The improvements of this invention relate to the more generally applicable type of extrusion process which may utilize a conventional screw-extruder to perform a minimum of three functions: (1) melting the polymer, (2) metering molten polymer to a mixing zone, and (3) mixing molten polymer with a liquid foaming agent to produce foamable solutions or dispersions. In known processes, additional solid components (such as inert, solid, bubble-nucleation agents) are preblended with the polymer, metered into the extruder with the polymer, or introduced to the extruder through a separate hopper at or near the polymer feed location. Additional liquid or gaseous components are similarly handled with respect to the liquid foaming agent.

This invention provides a process for decreasing the cell-size and for improving cell-size uniformity in extruded polymeric foams by the use of inert, solid, finely divided, bubble-nucleation agents. More specifically, it provides for a great reduction in the required concentration for said bubble-nucleation agents. Further, it provides a more uniform dispersion of said bubble-nucleation agents within the foamable composition. Still further provisions of this invention are to be found in the remainder of this specification.

The invention meets the desired goals by providing in a process for the formation of foamable compositions consisting essentially of thermoplastic polymer, volatile low-boiling liquid foaming agent and finely divided solid inert bubble-nucleation agent said process comprising the steps of melting, metering and mixing of said foamable composition; the improvement which comprises:

(1) Melting the thermoplastic polymer prior to the inclusion of the foaming agent and the bubble-nucleation agent;

(2) Metering the flow of the molten thermoplastic polymer into a mixing zone characterized by relatively low shear gradients;

(3) Forming a dilute suspension of the solid bubble-nucleation agent in the liquid foaming agent, and subsequently introducing the dilute suspension into the mixing zone; and thereafter, (4) Mixing the dilute suspension and said molten thermoplastic polymer in said mixing zone.

A still greater improvement is effected if, in addition to the above requirement, the dilute suspension of said bubble-nucleation agent in the liquid foaming agent is stabilized by a minor quantity of surfactant, e.g., n-butanol, which neither decomposes nor chemically reacts with other components of the foamable composition at the elevated temperatures and pressures maintained within the mixing zone.

Referring to the accompanying figures will aid in better understanding this invention.

FIGURE 1 is a schematic representation in elevation of a multiple-zone screw-extruder suitable for forming foamable compositions according to this invention.

FIGURE 2 shows an alternative series arrangement of two extruders suitable for forming foamable compositions according to this invention.

FIGURE 3 is a detail of a screw suitable for the extruder shown in FIGURE 1.

FIGURE 4 is a full scale detail of zones 1 and 2 of FIGURE 3.

FIGURE 5 is a full scale detail of zone 3 of FIGURE 3.

With reference to FIGURE 1, a typical multiple-zone screw-extruder, suitable to the practice of this invention, is generally indicated by the numeral 10. It is essentially a cylindrical shell 11 enclosing a screw 12 and provided with a solids-feed hopper 13, an inlet 14 for injection of liquids, a discharge outlet 15 for the foamable composition, and a suitably sealed drive shaft 16 through one end of shell 11 by means of which power source 17 rotates screw 12. Heating and cooling means (not shown) are additionally provided along shell 11 for control of the temperature-profile of materials passing through the extruder, and extra solids-feed hoppers or inlets for liquids may optionally be provided. The screw 12 varies in root diameter, size and spacing of screw flights, and clearance between outer screw-flight surfaces and the inner surface of the shell 11. Basically these variations are designed to generally divide the path through extruder 10 into zones as indicated in FIGURE 1 where zone 1 designates the polymer-melting zone, zone 2 the polymer-metering zone, and zone 3 the mixing zone where all components of the foamable composition are uniformly dispersed or dissolved, as the case may be. The specific configuration shown in zone 3 is generally referred to as a torpedo mixer. These zones may be clearly indicated by abrupt changes in screw design, or gradual design changes may result in gradual changes in zone-functions along the length of the screw 12.

In conventional operation of extruder 10, polymer particles and additional solid additives are fed through hopper 13 into barrel 11 and forwarded by screw 12. At the end of melting zone 1 the polymer is molten and at its maximum pressure. Most of the input energy from power source 17 is dissipated within melting zone 1 in the form of heat, which heat largely contributes to raising the temperature of the polymer and to melting it. The forces exerted on the polymer in melting zone 1 naturally result in high shear gradients. Metering zone 2 is that portion of the path where the free cross-section available for flow of the molten polymer is a minimum. It serves as a partial barrier to flow so that the required high pressures can be developed and at the same time tends to provide uniform flow of molten polymer into mixing zone 3 regardless of pressure fluctuations in zone 1. Because of the restricted area available for polymer flow in metering zone 2, linear velocity of molten polymer is high and very high shear gradients are encountered. At the entrance to mixing zone 3, liquid foaming agent and optional liquid additives are normally injected into the molten polymer under pressure produced by a suitable metering pump 18. Remaining passage through mixing zone 3 blends the foamable composition to render it uniform, but relatively low shear-gradients are involved due both to the screw-design and to the decreased viscosity resulting from liquid addition. Outlet 15 can be an extrusion orifice for direct foam formation, or it can be an attachment for a transfer line to an accumulator from which the uniform foamable composition can later be forced through an extrusion orifice.

FIGURE 2 illustrates an alternative apparatus 20 involving two extruders 22 and 24 in series. Screw 23 of extruder 22 provides the melting zone 1 and the metering zone 2. Transfer line 26 leads molten polymer to second extruder 24 having screw 25 which provides only a mixing zone 3. Extruder screw 25 is driven by a separate power source 21 so that greater versatility and productivity usually result from the use of apparatus 20. Otherwise, general operation is identical to that of extruder 10, and other modifications in apparatus design are obvious.

Finely divided, solid, inert, bubble-nucleation agents useful in extrusion of small-cell foams of thermoplastic polymers include silicates, silica, alumina, titania, magnesia, powdered metal, and the like as are familiar to one skilled in the art. Average diameters of these particles are usually in the range from about 0.01 to 3.0 microns, although both smaller and larger particle diameters can frequently be employed successfully. The smaller the diameter, of course, the greater is the surface area and the more efficient is the bubble-nucleation agent on a weight basis.

The mechanism by which solid inert particles nucleate the formation of bubbles is not accurately known, but it is presumed that small pores entrap minute quantities of vapor which, upon rapid drop of pressure during foam extrusion, expand to nucleate bubbles. "Santocel–54" silica aerogel (manufactured by the Monsanto Chemical Co.) is an excellent bubble-nucleation agent. Its particles average 1.5 microns in diameter and have rough irregular surfaces which readily could serve as vapor-pores. On the other hand, "Cab-O-Sil" M–5 colloidal silica (manufactured by Godfrey L. Cabot, Inc.) with a particle size of about 0.015 microns and "Ti-Pure R–101" titanium dioxide in rutile form (manufactured by E. I. du Pont de Nemours & Co., Inc.) with a particle size of about 0.2 microns both have non-porous particle surfaces but nucleate bubbles very effectively. It is assumed that these extremely small particles form small, stable agglomerates to provide vapor-pores.

When solid bubble-nucleation particles are introduced first at mixing zone 3 as a dispersion in the liquid foaming agent, bubble-nucleation efficiency is very high. When, as in all known prior art, they are fed to the extruder with the polymer, bubble-nucleation efficiency is low. The cause for low bubble-nucleation efficiency in prior-art processes is unknown, but it is possible that, because of high shear gradients in melting zone 1 and metering zone 2: (1) the pores of the particles become filled with polymer, (2) the particles are so crushed as to be nearly devoid of pores, and/or (3) such large agglomerates are formed that the number of sites available for nucleation of bubbles is greatly reduced.

The smaller the number of nucleating particles required to produce one bubble (or cell) in the foamed product, the higher is the bubble-nucleation efficiency. This number is always unexpectedly large regardless of the means of incorporating bubble-nucleation particles in the foamable composition. When, in companion experiments comparing different ways for adding nucleating particles, one experiment yields a foamed product with smaller foam-cells, it is the more efficient in nucleating bubbles. The smaller the cells, the more there are per unit of polymer in the foam. Relatively small reductions in average transverse dimensions of the cells correspond to rather great increases in bubble nucleation efficiency since cell-volume is proportional to the cube of the cell's average transverse dimension. Likewise, greater efficiency is indicated if one experiment yields a given reduction in cell-size at a reduced concentration of nucleating particles. Whenever either the extrusion orifice or the filter screens become plugged with nucleating particles, efficiency is lowered in an obvious but different sense. Even transient partial plugging of extrusion orifices is inefficient since it causes flaws or holes in the foamed product.

According to this invention, the solid bubble-nucleation particles are dispersed in the liquid foaming agent before and during its injection into mixing zone 3 of the extruder. The particles tend to sediment out of the dispersion, and effective stirring is necessary to maintaining a uniform dispersion. Moreover, viscosity of the liquid foaming agent is increased by the added particles, and injection into the extruder is therefore more difficult.

Even further improvement in efficiency occurs if the solid nucleating particles are dispersed in the liquid foaming agent along with a surfactant at about 0.05 to 2% by weight of foaming agent. The surfactant should be soluble in the liquid foaming agent and should be chemically stable at the temperatures and pressures required for foam extrusion. Furthermore it is preferably non-toxic, odorless or not obnoxious, and relatively easily removed from the extruded foam. Most surfactants, such as frequently useful detergents, decompose at the required temperatures, which generally range from 100 to 250° C. Alcohols constitute a class of surfactants generally suitable for foam-extrusion according to this invention. Particularly suitable are the aliphatic alcohols in the series from ethanol through decyl alcohol and their phenyl-substituted counterparts such as benzyl alcohol. Within these alcohols, the tendency toward obnoxious odors and difficulty of removal increases generally with increasing molecular weight. Butyl alcohol, and more particularly n-butyl alcohol, provides all the desired functions of a surfactant for use in this invention, is usually the most efficient on a weight basis, and is the preferred surfactant. On addition of surfactant, previously cloudy dispersions become clear and sedimentation of particles from the dispersion is substantially eliminated. Moreover, the large increase in viscosity of the dispersions, which occurs when no surfactant is employed, is prevented.

The amount of bubble-nucleation agent required for a given level of cell-size reduction depends on the agent selected, on the types and concentrations of other components of the foamable composition, on both temperature and pressure employed, and especially on how the bubble-nucleation agent is added to the foamable composition. Experience has shown that, when subjected to melting zone 1 and/or to metering zone 2, solid nucleating agents must usually be present at from about 1 to 5%, or more, by weight based on the polymer. When introduced to mixing zone 3 as a dispersion in the liquid foaming agent, only from about 1% down to 0.05% or less of solid nucleating agent is required for the desired cell-size control.

The improvements in bubble-nucleation efficiency achieved through the use of this invention are illustrated by the following examples; but, since variations are obvious to one skilled in the art, the invention is not so limited except as specified in the appended claims. Certain equipment and procedures were common to all of the following examples. Where polyethylene is specified, it is the linear, high-density variety identified as "Alathon" Type 7010 polyethylene (E. I. du Pont de Nemours & Co., Inc.) with a melt index of 0.5 (A.S.T.M. D1238–61 Condition E). Where stereoregular polypropylene is specified, it was "Profax" polypropylene (Hercules Powder Co.) with a melt flow as determined according to A.T.S.M. D1238–61, Condition L.

At about 3 to 4 inches (7.5 to 10.0 cm.) upstream from the extrusion orifice a screen-pack was placed for filtering the foamable composition. On either the downstream face or on both faces 20-mesh screens were used to support the filtering screens (all screen sizes are according to the U.S. Sieve Series).

Foamable compositions were prepared using a 2 inch (5.08 cm.) inside diameter screw-extruder 10 with a length-to-diameter ratio (L/D) of 26:1. Melting and metering of the polymer was in the initial 15:1 L/D section. Liquid foaming agent was injected into molten polymer through probe 14 at the beginning of the 11:1 L/D mixing section 3. The liquid foaming agent was supplied from a large pressurized blowcase provided with a magnetic stirrer so that, where applicable, solid nucleating agents could be kept throughly dispersed. Passing through suitable flow-measuring and flow-regulating devices, the liquid foaming agent was injected into the extruder by a metering pump at a pressure sufficiently high to assure positive forward flow.

The uniform foamable composition leaving extruder 10 at outlet 15 passed via a heated transfer line to a 10 gallon (about 37.8 liter) accumulator where it was collected. In the transfer line, temperature of the composition was greater than or about 180° C. An accumulator was used primarily because the flow-rate during extrusion of the foamed products was greater than the capacity of extruder 10 to provide foamable composition. Secondarily, the desired temperature and pressure for foam-extrusion were obtained during retention of the composition in the accumulator. A constant pressure was maintained on the contents of the accumulator usually by a free piston isolating the foamable composition from the oil in a hydraulic pressure system. Occasionally, nitrogen from a ballast tank supplied the necessary pressure. Temperature regulation was also provided.

When tubular foamed products were obtained by extrusion through an endless-slot, annular orifice, they were collapsed by passing through pinch rolls about 3 feet (about 1 meter) downstream from the orifice. This caused gas to collect witthin the tube between the orifice and the pinch rolls and to inflate the tube so as to flatten the longitudinal pleats which otherwise would have remained in the walls.

All parts and percentages are by weight unless otherwise specified.

EXAMPLE I

Using the procedure and equipment hereinabove described, four products were prepared by extrusion through endless-slot, annular orifices. Pressure on the foamable composition in the accumulator was provided from a ballast of nitrogen gas. The polymer employed was linear polyethylene, and the liquid foaming agent was methylene chloride. The solid nucleating agent was "Santocel"–54 silica aerogel (Monsanto Chemical Co.). In Table I, the "percent solids" column includes all the polymer. When nucleating particles were added with polymer, "percent solids" also includes them. The "percent liquid" column includes all of the injected liquid foaming agent and, where a dispersion of nucleating particles was used, it includes their weight, too. Both temperature and pressure of the foamable composition were measured near the extrusion orifice. The Santocel concentration is in grams per 100 grams of polymer, regardless of how it was added. Cell sizes (average transverse dimensions) were obtained by microscopic examination of cross-sections cut with a razor blade while the foamed product was frozen, thus avoiding distortion.

In Table I, product A was prepared using no nucleating particles. The polymer chips employed to prepare product B were tumbled with the Santocel before being fed to the extruder, pure methylelne chloride being injected subsequently. Product C was made like product B except ground polymer passing 20-mesh but retained by 30-mesh screens was tumbled with the Santocel. For product D, the Santocel was added as a mechanically maintained dispersion in the methylene chloride.

Products A, B, and C show that reductions in cell-size (improvements in nucleating efficiency) are obtained using inert, solid, bubble-nucleation particles in known processes, but product D obtained according to the teachings of this invention had the smallest cell-size and the narrowest distribution of cell-sizes.

trusion resulted in greater nucleation efficiency as evidenced by the measured cell-dimensions of from about 40 to about 100 microns. This reduction in cell-size corresponds to approximately an order-of-magnitude increase in the number of cells formed, and this was accomplished using 27% less nucleating particles. Thus, substantial in-

TABLE I.—FOAMS FROM LINEAR POLYETHYLENE/METHYLENE CHLORIDE SYSTEM

| Product | Percent solids | Percent liquid | Temperature (° C.) | Pressure (P.s.i.g.) | Pressure Kg./cm.$^2$ | Santocel (gm./100 gm. polymer) | Cell size (microns) |
|---|---|---|---|---|---|---|---|
| A [1] | 44.5 | 55.5 | 150 | 700 | 49.3 | 0 | >1,000 |
| B [1] | 44.5 | 55.5 | 148 | 500 | 35.2 | 1.0 | 200–250 |
| C [1] | 46.0 | 54.0 | 151 | 375 | 26.4 | 1.0 | 150–200 |
| D [2] | 48.0 | 52.0 | 151 | 600 | 42.2 | 1.08 | 100 |

[1] Extrusion orifice was 1.75 in. (4.44 cm.) diameter endless slot with a 0.010 in. (0.25 mm.) gap width and a 0.060 in. (1.52 mm.) land length.
[2] Extrusion orifice was a 1.50 in. (3.81 cm.) diameter endless slot with a 0.010 in. (0.25 mm.) gap width and a 0.030 in. (0.76 mm.) land length.

EXAMPLE II

Two more foamed products were prepared using the equipment and procedures of Example I. Both foamable compositions contained 40% by weight of linear polyethylene, and both were mixed with 60% by weight of injected liquid. The liquid foaming agent was "Freon"–11 trichlorofluoromethane (E. I. du Pont de Nemours & Co., Inc.).

One injected liquid contained sufficient "Santocel"–54 silica aerogel to provide 1.5 grams per 100 grams of polymer, and this aerogel was kept dispersed by stirring. Extrusion temperature was 140° C., and extrusion pressure increased from 340 p.s.i.g. (23.9 kg./cm.$^2$ gage) to 420 p.s.i.g. (29.6 kg./cm.$^2$ gage) during extrusion, probably because of partial plugging of the single 200-mesh filter-screen.

The other injected liquid contained "Santocel"–54 at 1.1 grams per 100 grams of polymer, and it was kept dispersed by the addition of n-butanol comprising 0.75% by weight of the injected liquid. Extrusion temperature was 145° C., extrusion pressure was 400 p.s.i.g. (28.1 kg./cm.$^2$ gage), and a 100-mesh filter-screen was employed.

The first product was extruded through an endless-slot orifice nominally 3.0 inches (7.62 cm.) in diameter with a 0.010 inch (0.25 mm.) gap width and a 0.060 inch (1.52 mm.) land length. Viewed from the face of the die, however, the outline shape of the slot was not circular but rather a regular serpentine trace deviating with small amplitude alternately from the inside to the outside of a circle with the above diameter. Such a die, because of its appearance, is called a gear die. A gear die imposes regular pleats in the walls of extruded, tubular, foamed structures thereby avoiding the otherwise irregular formation of pleats. It does not change the foam-properties of the product otherwise.

The orifice employed in forming the second product was a simple, annular, endless slot with 2.25 inch (5.22 cm.) diameter, 0.010 inch (0.25 mm.) gap width, and 0.020 inch (0.50 mm.) land length.

Except for the use of n-butanol as a surfactant in the second of the above extrusions, the conditions employed were substantially identical. The product obtained using mechanically dispersed silica aerogel had small cells ranging from about 100 to about 200 microns in the transverse dimensions. The use of surfactant in the second excrease in nucleating efficiency is seen to result if the dispersion of nucleating particles is stabilized with an alcoholic surfactant.

EXAMPLE III

Four more foamed products were made as described in Examples I and II. The solid polymer chips were of stereo-regular polypropylene with melt-flow of 4.0 ("Profax" Type 6511E or Type 6512 polypropylene of the Hercules Powder Co.). The liquid foaming agent was a 90/10 mixture of trichlorofluoromethane and 1,2-dichloro-1,1,2,2-tetrafluoroethane. Table II, entries for which have the same significance as corresponding entries in Table I, shows most of the conditions used and the cell-sizes obtained.

TABLE II.—FOAMS FROM POLYPROPYLENE/TRICHLOROFLUOROMETHANE/DICHLOROTETRAFLUOROETHANE SYSTEM

| Product | Percent solids | Percent liquid | Temperature (° C.) | Pressure (P.s.i.g.) | Pressure Kg./cm.$^2$ | Santocel (gm./100 gm. polymer) | Cell size (microns) |
|---|---|---|---|---|---|---|---|
| E [1] | 50 | 50 | 140 | 400–600 | 28.1–42.2 | 0 | 200–600 |
| F [2] | 45 | 55 | 140 | 340 | 23.9 | 1.0 | 100–250 |
| G [2] | 45 | 55 | 145 | 340 | 23.9 | 1.0 | 60–160 |
| H [3] | 45 | 55 | 140 | 350 | 24.6 | 1.2 | 40–100 |

[1] Die was annular slot; 2.25 in. (5.72 cm.) diameter, 0.007 in. (0.18 mm.) gap width, 0.020 in. (0.51 mm.) land length. Accumulator pressurized with hydraulically operated free piston.
[2] Die was annular slot; 1.50 in. (3.81 cm.) diameter, 0.006 in. (0.15 mm.) gap width, 0.100 in. (2.54 mm.) land length. Accumulator pressurized from nitrogen ballast.
[3] Die was annular slot; 2.25 in. (5.72 cm.) diameter, 0.005 in. (0.13 mm.) gap width, 0.100 in. (2.54 mm.) land length. Accumulator pressurized with hydraulically operated free piston.

The Santocel–54 silica aerogel of product F was tumbled with the polymer chips before feeding polymer to the extruder, and this product is typical of known prior art. The silica aerogel of product G was added to the molten polymer as a mechanically maintained dispersion in the liquid foaming agent, and it represents one form of practicing this invention. Product H was prepared according to the preferred process of this invention in which the silica aerogel was dispersed in the liquid foaming agent along with n-butanol at 0.5% by weight of injected liquid.

As can readily be seen from the measured cell-sizes in Table III, nucleating efficiency in terms of cell-size and of cell-size uniformity increased in each extrusion from E through G. In particular, dispersion of nucleating particles in the liquid foaming agent is seen to be most effective, especially when an alcoholic surfactant is employed.

EXAMPLE IV

The improvements of this invention are again shown by the following three products. The stereo-regular polypropylene used was the same as in Example III, and the liquid foaming agent was a 90/10 mixture of methylene chloride, and 1,2 - dichloro-1,1,2,2-tetrafluoroethane. In each case the extrusion orifice was a gear die with nominally a 3.0 in. (7.62 cm.) diameter, with a 0.005 in. (0.13 mm.) gap width, and with a 0.060 in. (0.15 mm.) land length. Nitrogen ballast pressure was used in the accumulators for products I and J, but the hydraulically operated free piston was used for product K. Addition of Santocel–54 silica aerogel to product I was by tumbling it with the polymer chips before charging them to the extruder. Mechanically maintained dispersion in the liquid foaming agent was employed for product J, and for product K a dispersion was used which contained n-butanol as surfactant at 1% by weight of injected liquid. Table III presents pertinent conditions and results.

mixing, and other known low-shear mixing devices may be substituted, whether or not based on a screw-extruder design. FIGURE 3 is a representation of an entire single screw with melting zone 1, transition T, metering zone 2, and mixing zone 3 indicated. FIGURES 4 and 5 are full-scale details of broken out portions of zones 1 and 2, and zone 3, respectively.

TABLE III.—FOAMS FROM POLYPROPYLENE/METHYLENE CHLORIDE/DICHLORO-TETRAFLUOROETHANE SYSTEM

| Product | Percent solids | Percent liquid | Temperature (° C.) | Pressure (P.s.i.g.) | Pressure Kg./cm.$^2$ | Santocel (gm./100 gm. polymer) | Cell size (microns) |
|---|---|---|---|---|---|---|---|
| I | 50 | 50 | 140 | 600 | 42.2 | 1.0 | >200 |
| J | 48 | 52 | 140 | 360 | 25.3 | 1.08 | 20–200 |
| K | 48 | 52 | 140 | 490 | 34.5 | 1.08 | 20–80 |

The improvemnts in nucleation efficiency shown by products J and K of this example illustrate the advantages of this invention just as shown by other systems in Examples I–III.

EXAMPLE V

This example shows that addition of nucleating particles as dispersions in liquid foaming agents not only increases the nucleation efficiency at particle concentrations near those employed in prior art processes but also provides equivalent or superior nucleating efficiency at considerably lower concentrations. The equipment employed for the process of this example was substantially as described hereinabove, but the product was a foamed filament obtained by extrusion through a cylindrical hole 0.030 inch (0.76 mm.) in diameter and 0.250 inch (6.35 mm.) in length.

The polymer employed was "Profax" Type 6823 stereo-regular polypropylene (Hercules Powder Co.) with an average melt-flow number of 0.53. It was fed to the extruder with no modification. A liquid composition was injected into the molten polymer in the mixing section at a rate which provided a foamable composition comprising 50% by weight of polymer. The liquid composition was obtained by mixing 10% of perfluorocyclobutane, 45% of pentane, and 45% of hexane. "Santocel"–54 silica aerogel was then dispersed in the liquid composition along with benzyl alcohol as surfactant. Percentages for these last two components are based on the weight of polymer in the foamable composition.

For both of these products the extrusion temperature was 150° C. and the extrusion pressure 1100 p.s.i.a. (77.4 kg./cm.$^2$). With both Santocel–54 and benzyl alcohol at 1% levels, the extruded foam-filament had a diameter of 0.50 cm., a density of 0.0106 gm./cc., an average cell-size of about 140 microns and an average cell-wall thickness of 0.40 microns. With the Santocel–54 and benzyl alcohol levels at the greatly decreased level of 0.125% the corresponding properties were: 0.51 cm. diameter, 0.00846 gm./cc. density, 100 micron average cell-size, and 0.115 micron average cell-wall thickness.

In this example, as in numerous similar ones, it was found that the improvements resulting from the practice of this invention were even greater when concentrations of nucleating particles were at the unprecedentedly low levels of from 0.1 to 0.5 grams per 100 grams of polymer.

In the process of this invention it is critical that the mixing step result in relatively low shear gradients to prevent loss in efficiency of the solid, bubble-nucleation particles. Thus, while the high shear gradients of a conventional screw-extruder are ordinarily employed in practicable steps for melting and metering the polymer, the mixing with dispersions of bubble-nucleation particles in liquid foaming agent must be performed at much lower shear gradients. The previous examples have shown the process of this invention utilizing a single screw to perform the functions of melting, metering, and mixing, the mixing zone 3 (FIGURES 3 and 5) being modified to create low shear. The modification is shown as a torpedo mixer. A second series extruder 24 as shown in FIGURE 2 should be modified to provide only low-shear Since differences in materials used, concentrations, temperatures etc., cause variation in viscosity, it is not possible to state an absolute value for the "low shear gradient" required. However, it will be evident to one skilled in the art that such a value can be determined by routine experimentation for particular conditions. The views shown in FIGURES 4 and 5 are full scale to aid in the understanding of this invention, as specifically shown in the examples, but are not intended as a limitation thereof. Following the process of this invention, the shear gradients that are necessary are readily determined by routine experimentation, and suitable apparatus to create this shear can be provided.

The present invention provides many advantages over the prior art. A reduction in the required concentration of bubble-nucleation agent and a more uniform dispersion of it within the foamable composition are realized. These factors, combined with the other important aspects of the invention, are produced by the present improved process. When this foamable composition is further processed utilizing known foaming techniques an improved foam is produced wherein cell-size is decreased and the foam is characterized by a greater degree of cell-size uniformity. A still further improvement is effected in the embodiment of this invention including the stabilization of the liquid foaming agent by the use of a minor quantity of surfactant. This embodiment has the further desirable quality of inhibiting sedimentation and preventing a large increase in viscosity of the dispersions.

The special problems concerning the dispersion of finely divided, solid, bubble-nucleation agents are unique and different from general dispersion problems. The art concerning dispersion of other materials, such as pigments, is not concerned with maintaining the nucleation characteristics of the material. Due to the uncertainty in the mechanism by which these particles nucleate the formation of bubbles, prior general dispersion processes, per se, concerning different materials offer no solution to the unique problem solved by the present invention. The present invention has supplied a unique solution to a particular problem existing in the foam art. The present invention provides a process for producing foamable compositions used to prepare foams with improved uniform small cells. The utility of such improved foams is obvious to one skilled in the art.

Since many modifications and changes in details may be made without departing from the spirit of the invention, the scope of the invention is defined by the following claims.

What is claimed is:
1. In a process for the formation of foamable compositions consisting essentially of thermoplastic polymer, volatile low-boiling liquid foaming agent and finely divided solid inert bubble-nucleation agent said process comprising the steps of melting, metering and mixing of said foamable composition; the improvement which comprises:
   (1) melting said thermoplastic polymer in a zone characterized by relatively high shear gradients prior to the inclusion of said foaming agent and said bubble-nucleation agent;

(2) metering in said zone the flow of said molten thermoplastic polymer into a mixing zone characterized by relatively low shear gradients;
(3) forming a dilute suspension of said solid bubble-nucleation agent in said liquid foaming agent, and subsequently introducing said dilute suspension into said mixing zone; and thereafter,
(4) mixing said dilute suspension and said molten thermoplastic polymer in said mixing zone.

2. The process of claim 1 wherein said melting is screw extrusion melting and said metering is screw extrusion metering.

3. The process of claim 1 wherein said bubble-nucleation agent comprises from about 0.05 to about 1% by weight of said thermoplastic polymer.

4. The process of claim 1 wherein said liquid foaming agent has an atmospheric boiling point at least 25° C. below the melting point of said thermoplastic polymer.

5. The process of claim 4 wherein said boiling point is at least 60° C. below said melting point.

6. A process for the formation of foamable compositions consisting essentially of thermoplastic polymer volatile low-boiling liquid foaming agent, finely divided solid inert bubble-nucleation agent and surfactant; comprising the steps of:
(1) melting said thermoplastic polymer in a zone characterized by relatively high shear gradients prior to the inclusion of said foaming agent and said bubble-nucleation agent;
(2) metering in said zone the flow of said molten thermoplastic polymer into a mixing zone characterized by relatively low shear gradients,
(3) forming a dilute suspension of said solid bubble-nucleation agent in said liquid foaming agent and said surfactant and subsequently introducing said dilute suspension into said mixing zone; and thereafter,
(4) mixing said dilute suspension and said molten thermoplastic polymer in said mixing zone.

7. The process of claim 6 wherein said surfactant comprises from about 0.05 to about 2% by weight of said foaming agent.

8. The process of claim 6 wherein said surfactant neither decomposes nor chemically reacts with other components of said foamable composition under the conditions maintained within said mixing zone.

9. The process of claim 7 wherein said surfactant is a lower alcohol.

10. The process of claim 9 wherein said lower alcohol is n-butyl alcohol.

References Cited

UNITED STATES PATENTS 3,160,688  12/1964  Aykanian et al.
3,188,295  6/1965  Ballast et al.

MURRAY TILLMAN, Primary Examiner

W. J. BRIGGS, Jr., Assistant Examiner

U.S. Cl. X.R.

260—29.6, 33.4, 33.6, 33.8, 34.2, 41; 264—53